July 26, 1927.　　　　　　　　　　　　　　　　　　　　1,637,037
H. DE JONG
WIRE SPOOL AND CARRIER
Filed Dec. 2, 1924　　　　　　　　　2 Sheets-Sheet 1
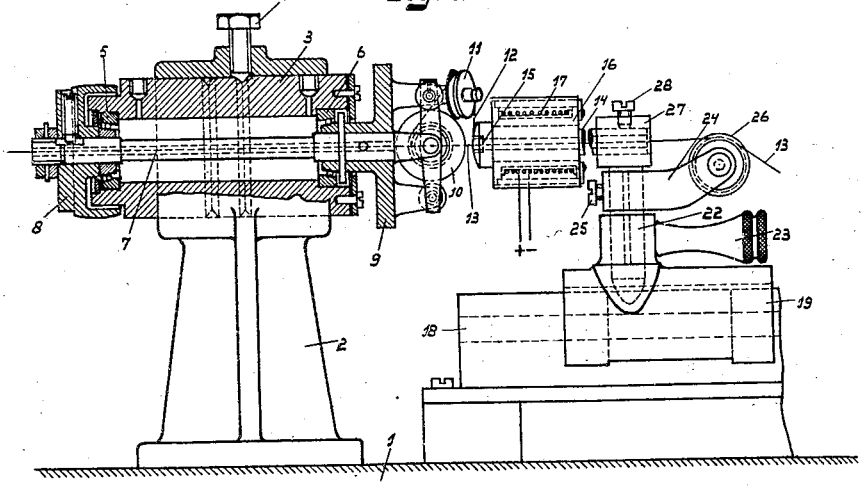
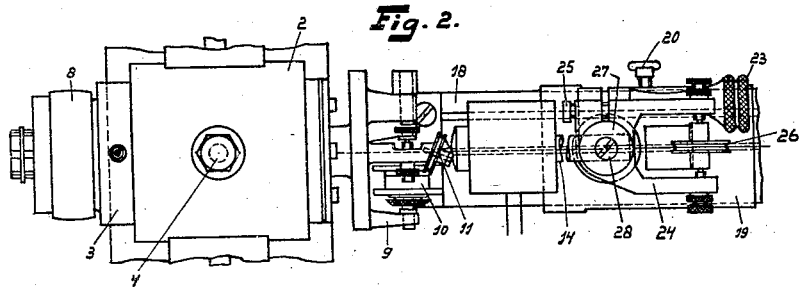
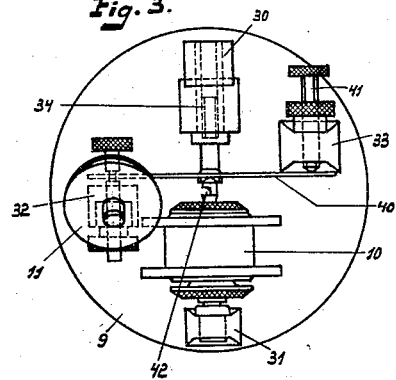
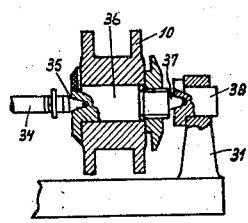
Inventor:
Hendrik de Jong,
by
His Attorney.

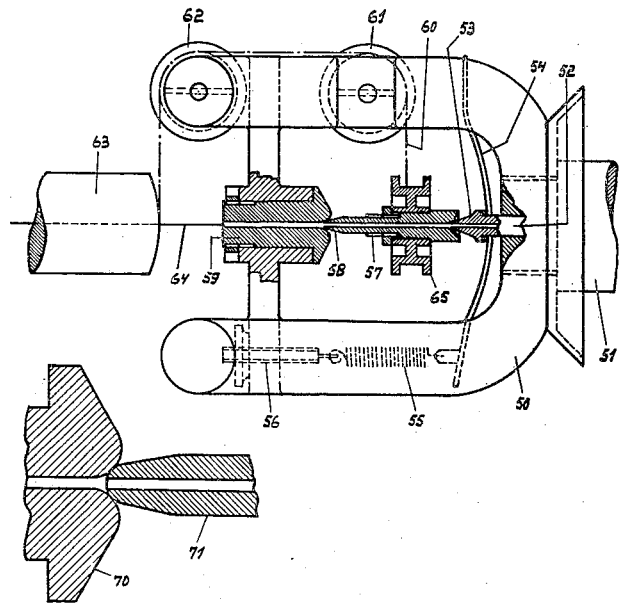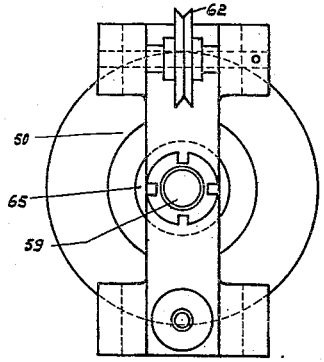

Patented July 26, 1927.

1,637,037

UNITED STATES PATENT OFFICE.

HENDRIK DE JONG, OF EINDHOVEN, NETHERLANDS, ASSIGNOR TO GENERAL ELECTRIC COMPANY, A CORPORATION OF NEW YORK.

WIRE SPOOL AND CARRIER.

Application filed December 2, 1924, Serial No. 753,521, and in the Netherlands January 25, 1924.

This invention relates to a wire spool and its carrier.

The invention is generally applicable to machines or apparatus in which a wire is wound off a rotary spool and more particularly it is applicable to mounting wire spools used in rotary winding-heads of helical wire winding machines, in which the wire coming from the wire spool is helically wound on a traveling mandrel, so as to enable them to rotate.

In some cases, for example in the said helical wire winding machines, it is highly essential that a wire spool should be braked quite accurately so that the wire running off the spool remains constantly taut and the tension of the wire also keeps a constant value, and the invention has for its object to brake a rotary wire spool uniformly so as to satisfy these requirements.

According to the invention the spool is mounted on pivots and a device is provided by which the pivots are pressed into their bearings. This device may be, for example, an electro-magnetic or a pneumatic one. According to the invention the pivots are preferably kept pressed into their bearings by a spring, the elastic force of which may be regulated.

The pivots should be understood to mean a solid of revolution, the diameter of which decreases more or less quickly towards the apex. The latter is preferably rounded and its surface may, for example, be similar to the apex of a paraboloid of revolution.

According to the invention the pivots and bearings may be so shaped that the pivots bear on only a narrow strip of their lateral surfaces. For this purpose the pivots and the bearings at their point of engagements may have convex surfaces turned to each other.

According to the invention, at least one of the pivots may be arranged at the end of a stud adapted to slide in the direction of its longitudinal axis, the said stud being resiliently pressed toward the pivot.

The wire spool with carrying device according to the invention lends itself eminently for use on a rotary winding head for helical wire winding machines.

In such a winding head the wire spool for the wire that is wound into a helix and that in the specification of the present invention and in the claims is referred to as "winding wire" may be arranged outside the axis or centrally.

In fast running machines the latter manner of arranging the wire spool is generally to be preferred, because then the centrifugal forces which in an excentric arrangement would have a harmful influence do not occur.

In the use of a wire spool adapted to rotate on pivots according to the invention and in fast running machines the excentric arrangement may cause the centrifugal force to reach a considerable value relative to the force that pushes the pivots into their bearings, and thus give rise to irregularly braking.

If the wire spool which is provided with an axial aperture to allow for the passage of the wire on which the winding wire is wound and which hereinafter is referred to as "mandrel wire" is centrally arranged in the rotary winding-head, the pivots and bearings are preferably arranged in the direction of movement of the mandrel wire in the order: pivot, bearing, pivot, bearing. This order has the advantage that in the direction of movement of the mandrel wire no obstacles are present in the passage traversed by the mandrel wire.

According to the invention the winding head may furthermore be U-shaped and the stationary bearing for the wire spool may be carried by a member that bridges the two legs of the U, the legs of the U containing guide-rolls for guiding the winding wire fed off the wire spool.

The accompanying drawings illustrate by way of example some embodiments of the invention.

In these embodiments the invention has been applied to resiliently braking a supply spool for a winding wire that is helically wound on a mandrel wire. In the construction as illustrated the mandrel wire is moved continuously and the winding wire is helically wound on the said mandrel wire by means of a rotary winding head.

In the said drawings:

Figure 1 is a vertical section and a partial view of a rotary winding head provided with a wire spool braked in accordance with the invention, said wire spool being arranged excentrically to the axis of rotation of the winding head. It also illustrates a side elevation of a device for winding the winding wire on the mandrel wire and for guiding the wound mandrel-wire further.

Figure 2 is a plan of the device shown in Figure 1.

Figure 3 is a side elevation of the rotary winding head shown on a large scale and, Figure 4 is a section taken on the spindle of the rotary winding spool braked in accordance with the invention.

Figures 5 and 6 show a construction in which the wire spool is arranged co-axially with the winding head.

Figure 5 is a side elevation and a partial section of such a winding head, and

Figure 6 is a front elevation of the winding head shown in Figure 5.

Figure 7 illustrates on a large scale a construction of a centre-point with its bearing.

In the device shown in Figures 1, 2, 3 and 4, a machine-frame 1 has rigidly secured to it a housing 2. The latter carries a bushing 3 which is rigidly secured in it by means of a set screw 4 and in which a shaft 7 is journaled on ball bearings 5 and 6. One end of the shaft 7 has fast on it a pulley 8 to enable the shaft 7 to be rotated from any suitable driving means. The other end of the shaft 7 has rigidly secured to it a winding head 9. The latter carries a supply spool 10 for a winding wire 12 which passes over a guide-roll 11 and at the end of a guide 14 is helically wound on a mandrel 13, which is moved at a regular velocity by any suitable device not illustrated. The guide 14 may be electrically heated by a coil 17 and is secured by a bolt 28 in the head 27 of a post 22 fixed to a slide 19.

The wound mandrel wire passes over a guide roll 26 and thence to a supply spool not illustrated.

The manner in which the wire-spool 10 is braked is clearly shown in Figures 3 and 4 of the drawings. The winding head 9 has on it four lugs or housings 30, 31, 32, 33. The wire spool 10 is so arranged as to rotate between the lugs 30 and 31. A resiliently pressed stud 34 which is adapted to slide in the housing 30 is provided at the end with a pivot 35 which engages a conical bearing provided in the spindle 36 of the wire spool 10. The spindle 36 has at its other end a tapered pivot 37 which rotates in a corresponding conical bearing in a block 38 carried on the winding head. The stud 34 with the tapered pivot 35 on its end is resiliently pressed into the bearing in the spindle 36 by an adjustable leaf spring 40, one end of which is secured to the housing 32, the tension of the said spring being regulated by a set-screw 41, mounted in the housing 33 to engage the other end of the spring. The pivots 35 and 37 are consequently resiliently pressed into their bearings, which ensures a very regular braking of the wire spool 10.

A slot 42 best seen in Figure 3 made in the stud 34 near the pivot 35 allows for the passage of the mandrel wire.

The winding head shown in Figures 5 and 6 comprises a yoke 50 rigidly attached to the end of a shaft 51, in which a stud 52 is adapted to slide.

A leaf spring 54 is secured to the stud 52 and pushes it to the left (in Figure 5 of the drawings), the tension of the spring being regulated by a set-screw 56 connected to a helical spring 55.

A wire spool 65 for a winding-wire 60 is arranged on the spindle 57 which at one end is provided with a bearing engaged by a pivot 53 and at the other end with a pivot 58 adapted to rotate in a corresponding bearing of a block 59, these pivots being tubular or apertured to permit the mandrel wire to pass through them.

The winding-wire 60 passes from the spool 65 over guide-rolls 61 and 62 to a guide 63, the end of which serves to support the winding wire while the latter is being wound on the traveling mandrel wire 64. The guide 63 may be rigidly attached to the machine-frame.

The mandrel wire 64 passes through axial apertures made in the stud 52, the spindle 57 and the block 59 from the right to the left in Figure 5 and does not meet any obstacles near the pivots 53 and 58.

It is essential that the pivots 35 and 37 (Figure 4) or 53 and 58 (Figure 5) as well as their bearings should be quite accurately finished and preferably consist of hard material, for example, tempered silver-steel.

Figure 7 of the drawings shows on a large scale a pivot with its bearing by means of which it is possible to obtain very good results in practice. In this construction the pivot and the bearing have at their point of engagement convex surfaces turned to each other so that the pivot does not bear on its point, but on a narrow strip of its lateral surface.

What I claim as new and desire to secure by Letters Patent of the United States, is:

1. A coil winding machine comprising a rotary winding head, a wire spool having a spindle with a tapered pivot at one end and a conical bearing at the other end, a bearing on said head for said pivot, and a resiliently mounted pivot on said head to engage the bearing in said spindle.

2. A coil winding machine comprising a rotary winding head, a conical bearing on said head, a pivot slidably mounted on said head in alignment with said bearing, an adjustable spring for resiliently pressing said pivot toward said bearing, and a wire spool having a spindle with a conical bearing in one end to cooperate with said resiliently pressed pivot and a pivot on the other end to cooperate with said bearing.

3. A coil winding machine comprising a rotary winding head, and a wire spool in said head having a spindle mounted in said head by cooperating conical pivots and bearings, shaped to have a narrow line of contact.

4. A coil winding machine comprising a rotary winding head, a wire spool in said head with a spindle having at one end a bearing with a convex surface and at the other end a pivot with a convex surface, and cooperating pivots and bearings on said head with convex surfaces to have a narrow line of contact with the bearing and pivot of said spindle.

5. A coil winding machine comprising a rotary winding head, a wire spool mounted in said head and having a tapered pivot at one end, and a conical bearing at the other end, a bearing on said head for said tapered pivot, a longitudinally movable pivot on said head to cooperate with said bearing in said spindle, and resilient means for moving said pivot longitudinally of said spindle in a direction to press the pivot on said spindle into its cooperating bearing.

6. A coil winding machine comprising a rotary winding head having a rotatably mounted wire spool provided with bearings to receive pivots on which said spool rotates, pivots mounted on said head to engage the bearings of said wire spool, and resilient means for adjustably pressing said pivots into the bearings of said wire spool.

7. In a coiling machine, the combination with means for imparting longitudinal movement to a mandrel of a winding head mounted to rotate about an axis concentric with said mandrel and comprising an apertured pivot and an apertured bearing mounted in alignment, a wire spool having a bearing and an apertured pivot to cooperate with said pivot and said bearing respectively, and means for pressing said pivots and said bearings into engagement.

8. In a coiling machine the combination with means for imparting longitudinal movement to a mandrel of a winding head comprising a member mounted to rotate about an axis concentric with said mandrel and having lugs parallel to and on opposite sides of said axis, a bearing carried by one of said lugs, a pivot carried by the opposite lug to cooperate with said bearing to rotatably support a wire spool on said member, and a guide pulley mounted on said member eccentrically thereof to guide the wire from the wire spool to the mandrel.

In witness whereof, I have hereunto set my hand this fifth day of November A. D., 1924.

HENDRIK de JONG.